2,892,819

DETERGENT COPOLYMERS

William T. Stewart, El Cerrito, Frank A. Stuart, Orinda, and Warren Lowe and Frank W. Kavanagh, Berkeley, Calif., assignors to California Research Corporation, San Francisco, Calif., a corporation of Delaware No Drawing. Application March 29, 1956
Serial No. 574,633

8 Claims. (Cl. 260—78.5)

This invention relates to a novel lubricant composition, and it is particularly directed to the provision of a lubricant composition which is adapted to be employed in internal combustion engines.

With the refinements now being made in automotive and other internal combustion engines, a great deal of attention is being directed to the provision of a lubricant which will permit the engine to be operated at a high level of efficiency over long periods of time. The primary function of the lubricant is, of course, to reduce friction and thereby not only decrease the wear on pistons, piston walls, bearings and other moving parts, but also increase the efficiency of the engine. Additionally, it is also a function of the lubricant to prevent the deposition of solid products on the piston walls and other surfaces of the engine coming in contact with the lubricant. Such deposits seriously interfere with efficient engine operation for they accelerate piston ring and cylinder wall wear and also increase oil losses by plugging the oil ring grooves. The troublesome deposits which form on the face of the piston and on the other walls of the combustion chamber, as well as on valves and spark plugs are also partially attributable in many cases to the lubricant, and especially to various of the metal-containing additives employed therein. It is of importance to eliminate or at least minimize the formation of all such deposits, and it is the basic object of this invention to achieve such a result.

To a minor degree, certain of the deposits formed on engine surfaces have their origin in the oil itself, that is to say, in the decomposition products of the oil. A more important, though still minor, source of engine deposits lies in the additives with which oils are conventionally supplied. This is particularly the case with metal-containing additives as, for example, the organic, metal-containing salts which are incorporated in the oil to increase the detergency thereof, and the various metal-containing compounds which are added to increase the lubricity of the oil and reduce piston ring and cylinder wall wear. Whenever oil is burned in the engine (as occurs with the oil film present in the cylinder wall during the combustion stroke) any metal-containing additives present in the oil may form an ash which is partially deposited out on the various surfaces of the combustion chamber and on those of the spark plugs and valves. Accordingly, it is a particular object of this invention to provide a lubricant composition which is compounded with metal- or mineral-free detergents and wear-reducing additives.

While certain of the additives heretofore employed in oils (and to a lesser degree the oil itself) are partially responsible for deposits which form on engine surfaces, it is now recognized that the major source of such deposits or their precursors lies in the various aldehydes, acids, oxy-acids and other similarly reactive, partially-oxidized combustion products of the fuel. These products are formed both under pre-ignition conditions as well as during the combustion step proper, particularly during the period before the engine has reached operating temperature. Accordingly, under city driving conditions where the engine is repeatedly started in the cold condition and is seldom driven for a distance sufficient to reach the most efficient operating temperatures, the formation of partial oxidation products is particularly severe. Many of these partial oxidation products are carried down into the crankcase of the engine along with other blow-by gases, and since most are insoluble or only sparingly soluble in lubricating oils, they tend to separate from the oil and adhere to engine surfaces or form large droplets. In either case, under the elevated temperature conditions prevailing in the engine, these reactive monomers quickly polymerize to form solid masses which readily deposit out on the engine wall surfaces.

It is the practice in the art to prevent the formation of such deposits by adding to the lubricant a material normally referred to as a detergent. Insofar as is known, all the detergent additives which have heretofore been successfully employed on a commercial scale are organic, metal-containing compounds such as calcium petroleum sulfonate, calcium cetyl phosphate, calcium octyl salicylate, calcium phenyl stearate, the barium salt of wax-substituted benzene sulfonate, or the potassium salt of the reaction product of phosphorus pentasulfide and polybutene. Various of these detergents act by reacting chemically with deposit precursors to form harmless compounds. Others act to prevent flocculation or coagulation of solid particles in the oil and maintain the same in a state of suspension as finely divided particles. Still others not only perform this dispersant function but also effect the solubilization or emulsification of the sparingly soluble monomers in the oil and thereby greatly reduce the rate of polymerization. In the latter case, such polymer materials as do then form within the body of the oil are smaller in size and can be peptized or dispersed in the oil much more readily than is the case with the large polymeric particles which are formed on exposed engine surfaces or in droplets lying without the oil.

Detergents capable of acting in the latter fashion are preferably employed wherever possible, particularly in automotive engines to be operated under city driving conditions. However, even among the metal-containing additives, few are available which are capable of solubilizing any appreciable amount of all the many types of polymer precursors which are carried into the oil from the fuel. Accordingly, it is a more particular object of this invention to provide a lubricant composition incorporating a metal-free detergent which is capable of solubilizing or emulsifying in the lubricant large amounts of all the various partial oxidation products of the fuel which are carried into the oil, and which is also capable of maintaining in suspension in the oil the various solid polymeric materials which are present therein.

The problem of piston ring and cylinder wall wear, especially the control thereof, is also one which is closely related to the composition of the crankcase lubricant. Aside from abrasive wear, which is caused by dust and dirt and can be remedied by suitable filtering and air-cleaning means, a large part of the wear experienced by piston rings and cylinder walls is attributable to chemical attack by moisture and acidic products originating as by-products of fuel combustion. In engines operated at optimum temperature levels, these combustion products are largely discharged through the exhaust and breather pipe. However, under the relatively "cold" conditions experienced in city driving, and especially at cylinder wall temperatures below about 150° F., the moisture and acid products are condensed on the engine surfaces where they promote corrosive attack and are in a position to work past the piston and accumulate within the engine and in the crankcase oil. This difficulty is one which the art has heretofore met most successfully by supplying the lubricating oil with additives such as the various metal salts of petroleum sulfonic acids and other metal-organic compounds, especially those having a basic reaction. However, this practice has a disadvantage of adding still another metal-containing ingredient to the oil and therefore of increasing the deposit-forming characteristics of the lubricant composition. Accordingly it forms still another object of this invention to provide a lubricant composition containing a metal- or mineral-free additive which effectively decreases the wear experienced by piston rings and cylinder walls, particularly during periods before the engine has become thoroughly warmed to operating temperatures.

The present invention is based on the discovery that certain copolymers, which contain no metal component and therefore are substantially free of any ash-forming tendency, have the ability to impart excellent detergent and antiwear qualities to lubricating oils employed in internal combustion engines. In particular, these copolymers have the ability to solubilize in the oil large amounts of all the various partially oxidized combustion products of the fuels employed in internal combustion engines, while also having the ability of maintaining in a state of suspension any solid polymeric products present in the oil. Additionally, the copolymeric additives of the present invention effectively reduce the wear experienced by piston rings and cylinder wall surfaces even under the most unfavorable operating conditions such as are experienced during the starting and warming up of the engine. These additives have the advantage that they do not combine chemically with the various polymer precursors which are solubilized or dispersed in the oil, nor apparently do they act by a neutralization reaction in counteracting the effect of the various acidic fuel combustion by-products. Accordingly, they are capable of giving excellent protection against engine deposits and wear over extended operating periods. It should also be noted that the copolymeric additives of this invention are noncorrosive to the various bearing metals employed in engines.

Since the additives of the present invention differ in kind from any heretofore proposed for either detergent or antiwear purposes, it would have been surprising to discover that they were effective for either of these purposes. However, that they possessed not one but both of said qualities was altogether unexpected and could not have been predicted.

The polymeric additives of the present invention are copolymers of monomers selected from at least each of the first two classes of the classes consisting of (A) oil-solubilizing compounds having a polymerizable ethylenic linkage and containing a hydrocarbyl group of from 4 to 30 aliphatic carbon atoms, (B) esters of acidic compounds selected from the group consisting of $\alpha,\beta$-unsaturated monocarboxylic acids of from 3 to 8 carbon atoms each and $\alpha,\beta$-unsaturated, $\alpha,\beta$-dicarboxylic acids of from 4 to 12 carbon atoms each and anhydrides thereof, wherein a portion of the carboxyl groups of said acid compounds is monoester-linked to a member of the group consisting of polyalkylene glycols having from 2 to 7 carbon atoms in each alkylene group and alkyl ethers thereof, and another portion of the carboxyl groups is monoester-linked to an alcohol wherein at least 50% of the carbon atoms therein and not less than two thereof are attached to polar groups selected from the group consisting of hydroxyl and amino groups, and (C) acidic compounds selected from the group consisting of $\alpha,\beta$-unsaturated monocarboxylic acids of from 3 to 8 carbon atoms each, $\alpha,\beta$-unsaturated, $\alpha,\beta$-dicarboxylic acids of from 4 to 12 carbon atoms each, anhydrides thereof and half-esters thereof with a member of the group consisting of polyalkylene glycol alkyl ethers thereof and alcohols as defined in (B).

The oil-solubilizing monomer portion of the polymeric additives of this invention can be any compound having at least one ethylenic linkage ($>C=C<$), together with at least one substituent group which contains an oil-solubilizing hydrocarbyl group of from 4 to 30 aliphatic carbon atoms, and which is characterized by the ability to copolymerize through said ethylenic linkage with the polar monomer referred to above in the presence of a suitable catalyst. Alternatively, the oil-solubilizing aliphatic radical can be introduced into the copolymer, as will hereinafter be more fully described. This aliphatic radical, whether present in the original monomer or introduced into the copolymer, imparts oil solubility to the polymer and is preferably a branched or straight-chain alkyl radical or a cycloalkyl radical such as butyl, isobutyl, n-pentyl, n-hexyl, 2-ethylhexyl, decyl, dodecyl, tetradecyl, cyclohexyl, 4-ethylcyclohexyl, or the like, or an alkenyl radical such as oleyl, ricinoleyl, or the like, wherein the ethylenic double bond has substantially no copolymerizing tendency. Oil solubilizing monomers of this general character are well known in the art and are frequently employed as the oil-solubilizing portion of copolymers which are added to lubricating oils to improve the viscosity index and pour point characteristics thereof. They include such materials as olefins and ethylenically unsaturated ethers, esters, ketones, aldehydes, and the like.

The oil solubilizing monomers of component (A) may also be illustrated by the following general formula:

$$R_1(G')_{n'}CH=CH(G)_nR_2$$

in which $R_1$ and $R_2$ are members of the group consisting of hydrogen and hydrocarbon radicals of from 4 to 30 carbon atoms, at least one of which contains an aliphatic hydrocarbon group of from 4 to 30 carbon atoms as described above, G and G' are members of the class consisting of oxy (—O—), carbonyl

and carbonyloxy

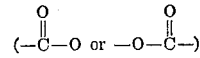

groups and combinations thereof with not more than two alkylene groups of from 1 to 7 carbon atoms each, and $n$ and $n'$ are 0 or 1. When $R_1$ and $R_2$ are hydrocarbon radicals, they may be alkyl, cycloalkyl, alkenyl, cycloalkenyl, aryl, alkaryl or aralkyl in structure, as illustrated by radicals such as 2-ethylhexyl, cyclohexyl, hexenyl, cyclohexenyl, phenyl, naphthyl, tertiary butylphenyl benzyl, etc., with the preferred radicals being as previously mentioned.

Representative oil-solubilizing monomer compounds which can be employed to form the copolymeric additives of the present invention include the following:

OLEFINS

| | |
|---|---|
| Hexene-1 | Octadecene-1 |
| 2-ethylhexene-1 | 4-octylcyclohexene-1 |
| Di- and triisobutylene | 3-phenylhexadecene-1 |
| Tripropylene | p-Octylstyrene |
| Dodecene-1 | Vinylcyclohexane |
| Hexadecene-1 | 2-hexadecylbutadiene-1,3 |
| Cyclohexene | p-Tertiarybutylstyrene |

ETHERS

| | |
|---|---|
| Vinyl n-butyl ether | Propenyl 2-ethylhexyl ether |
| Vinyl 2-ethylhexyl ether | Crotyl n-octyl ether |
| Allyl n-butyl ether | Isopropenyl dodecyl ether |
| Allyl isobutyl ether | 1-decenyl butyl ether |
| Allyl cyclohexyl ether | 1-eicosenyl decyl ether |
| Allyl 4,4,8,8-tetramethyl-docosyl ether | Vinyl p-octylphenyl ether |
| Methallyl n-hexyl ether | Methallyl p-tert. butylphenyl ether |
| Methallyl n-decyl ether | 1-decenyl p-cetylphenyl ether |
| Methallyl 2-ethylhexyl ether | 1-decenyl 2-phenylbutyl ether |
| Methallyl octadecyl ether | |

ESTERS

Vinyl caproate
Vinyl palmitate
Vinyl oleate
Allyl caprylate
Allyl laurate
Allyl oleate
Allyl palmitate
Allyl stearate
Allyl-2-ethylhexanoate
Allyl ricinoleate
Allyl esters of babassu acids
Allyl esters of lard acids
Allyl naphthenate
Methallyl caproate
Methallyl naphthenate
Methallyl ricinoleate
Methallyl p-octylbenzoate
Methallyl oleate
Methallyl cyclohexane carboxylate
Methallyl palmitate
Crotyl oleate
Crotyl naphthenate
α-Methylcrotyl palmitate
1-propenyl naphthenate
1-propenyl elaidate
Dodecyl acrylate
Hexadecyl methacrylate
Isobutyl α-decylacrylate
Vinyl p-n-octyl benzoate
Allyl 3,5-diisobutyl benzoate
Cyclohexyl methacrylate
Cyclohexyl 2-dodecenoate
Decyl vinylacetate
Isooctyl α-chloroacrylate
p-Isoamylphenyl 2-hexadecenoate
4-p-tolylbutyl 2-octadecenoate
Undecyl cinnamate
Methylcyclohexyl 2-ethyl-2-hexenoate
5-ethyldocosyl crotonate
Octadecyl isocrotonate
n-Butyl 2-eicosenoate
p-Tert. amylphenyl octadecyl maleate
p-Hexadecylphenyl 2-ethylhexyl maleate
o-Tolyl 2-octadecylcyclohexyl maleate
o-Nonylphenyl-hexadecyl maleate
Dihexadecyl maleate
Dimethylcyclohexyl maleate
Mono-2-ethylhexyl maleate
Di-2-ethylhexyl maleate
Di-dodecyl maleate
Di-dodecyl mesaconate
Di-dodecyl citraconate
o-Tolyl octadecyl itaconate
Mono-hexadecyl itaconate
Isopropenyl palmitoleate
1-decenyl laurate
1-hexadecenyl myristate Although any of the oil solubilizing compounds described above will give effective copolymer compositions for lubricant compositions in accordance with the present invention, higher alkyl esters of α,β-unsaturated monocarboxylic acids of from 3 to 6 carbon atoms having alkyl groups of from 8 to 30 carbon atoms are most preferred, both for availability and effectiveness of copolymers prepared from them. Representative acids of this type are the acrylic, methacrylic, crotonic, tiglic, angelic, α-ethylacrylic, α-methylcrotonic, α-ethylcrotonic, β-ethylcrotonic, β-propylcrotonic, and hydrosorbic acids and the like. Even more desirable are the alkyl esters of acrylic and methacrylic acids containing from 10 to 20 carbon atoms in the alkyl groups, since they are found to provide highly superior polymers for the lubricant compositions of the invention and are obtainable in commercial quantities.

Various copolymers employing representative oil-solubilizing monomers of the foregoing types were prepared to illustrate the oil solubilizing effect of the monomers on the resultant copolymers. The solubility of the copolymers in oil and their suitability as lubricating oil additives were demonstrated by incorporating the copolymers into lubricating oils. The lubricant compositions thus obtained were tested to determine their detergency and deposition properties. The results of these tests are given in Table I below.

In the tests the base oil, unless otherwise indicated, is a solvent-refined, wax-free, SAE-30 grade mineral lubricating oil having a viscosity index of 85 which is derived from California waxy crude. Various amounts of the copolymers are incorporated into the oil as indicated in terms of percent by weight.

The piston varnish ratings of the lubricant compositions were obtained by the standard FL-2 test procedure as set out in the June 21, 1948 report of the Coordinating Research Council. In this test the lubricating oil compositions were tested as crankcase lubricants in a 6-cylinder Chevrolet engine, using a low-grade gasoline especially prone to cause engine deposits. At the end of each test the engine was dismantled and the detergency or deposition properties of the lubricant compositions were determined by examining the engine deposits on the piston and visually rating them as to the amount of piston varnish present. The piston varnish ratings of the compositions are given in numerical terms on a scale of 0–10 with "10" representing the complete absence of deposits.

The deposition characteristics of the lubricant compositions containing the copolymeric additives were also determined in the lacquer deposition test. In this test typical engine fuel combustion products were passed into the lubricant compositions and the ability of the lubricant compositions to solubilize and retain the lacquer-forming materials was observed by weighing the amount of lacquer deposits formed on a fresh iron catalytic surface for a standard period of time. The lacquer deposit of the lubricant composition is taken as the number of milligrams deposit on the metal surface, and may be correlated directly to the piston varnish rating obtained in the standard FL-2 test procedure outlined in the above paragraph.

Both the FL-2 test procedure and the lacquer deposition test are more fully described in the disclosure which follows with regard to the particular lubricant composition of the present invention.

Table 1

| Lubricant composition | Ratio of (1) monomer to (2) monomer to (3) monomer | Piston varnish rating | Lacquer deposit (milligrams) | Piston varnish rating (estimated from lacquer deposit) |
|---|---|---|---|---|
| Base oil alone | | 3.0 | 850 | |
| 2.8% (1) dodecyl methacrylate, (2) N,N'-di-2-hydroxy-ethyl maleamide | 20/1 | | 450 | 5.0 |
| 2.8% (1) dodecyl methacrylate, (2) allyl stearate, (3) maleic anhydride | 20/1/1 | | 405 | 5.2 |
| 1.5% (1) dodecyl methacrylate, (2) N-(2-hydroxyethyl) methacrylamide | 7/1 | 6.3 | | |
| 3.0%* (1) tridecyl methacrylate, (2) octadecyl methacrylate, (3) monododecyl ether of hexadecaethylene glycol ᵃ methacrylate | 10/6/1 | 8.4 | | |
| 2.5% (1) allyl stearate, (2) didodecyl maleate, (3) di-(hydroxyethyl) ethylenediamine salt of monododecyl maleate | 5/5/2 | 5.5 | | |
| 2.8% (1) vinyl ethylhexoate, (2) itaconic acid | 15/1 | | 500 | 4.5 |
| 2.8% (1) vinyl stearate, (2) maleic anhydride, (3) monododecyl ether of pentaethylene glycol ᵇ methacrylate (4) methacrylamide | 30/1/2/1 | | 325 | 6.0 |
| 2.5% (1) allyl stearate, (2) ethylene glycol monooleate monomaleate, (3) mono-N,N'-di(2-hydroxy-ethyl) ethylenediamine maleate (salt) | 5/4/1 | 4.0 | | |
| 2.8% (1) octadecene, (2) monododecyl maleate, (3) monopentaerythritol maleate | 2/1/1 | | 500 | 4.5 |
| 2.8% (1) hexene-1, (2) dodecyl methacrylate, (3) methacrylic acid, (4) monododecyl ether of eicosaethylene glycol ᶜ methacrylate | 25/25/1/4 | | 400 | 5.5 |
| 2.8% (1) di-2-ethylhexyl fumarate, (2) octadecene-1, (3) crotonic acid, (4) monotridecyl ether of decaethylene glycol ᵈ methacrylate | 25/25/8/2 | | 570 | 4.0 |
| 2.8% (1) allylethyl ether, (2) vinyl stearate, (3) itaconic acid, (4) monododecyl ether of decaethylene glycol ᵈ crotonate | 14/50/7/3 | | | |
| 3.0% (1) vinyl 2-ethylhexyl ether, (2) tetradecylphenyl maleate, (3) dodecyl maleate, (4) maleic acid | 6/3/1/2 | 4.6 | | |
| 1.5% (1) dodecyl acrylate, (2) monododecyl ether of decaethylene glycol ᵈ acrylate (3) acrylic acid | 780/9/1 | 5.6 | | |
| 1.5% (1) hexadecyl styrene, (2) methacrylic acid | 5.8/1 | 5.9 | | |

*In 140 Neutral Mineral Lubricating Oil from solvent-refined waxy California crude.
ᵃPolyethylene glycol of 704 M.W.
ᵇPolyethylene glycol of 220 M.W.
ᶜPolyethylene glycol of 880 M.W.
ᵈPolyethylene glycol of 440 M.W.

From the above test data it will be seen that all of the various oil-solubilizing monomers representative of the aforementioned types were effective in the production of useful, copolymeric lubricating oil additives which are capable of preventing deposits from lubricant compositions under typical engine operating conditions. These monomers, as previously described, constitute a definite, recognized class of compounds which have been used heretofore in the art in the production of polymeric lubricating oil additives of the nonpolar type, such as VI improvers and pour point depressants. Although the results demonstrate beyond any reasonable doubt the suitability of the different oil-solubilizing monomers within the terms of the description in the production of oil soluble copolymers, it should be understood that the efficacy of each individual class of copolymers as detergents is primarily dependent upon the particular polar or functional group in the so-called polar monomer and its relationship to the rest of the copolymer.

Since the functionality of the individual polar groups differs and is largely empirical in nature, no conclusion is intended to be drawn concerning equivalency of the various copolymeric lubricating oil additives employed as detergents in this illustration. The polar groups of the particular class of copolymers of the compositions of this invention and their balance or relationship to the remainder of the copolymers are more fully discussed in the disclosure which follows, along with additional examples of the invention.

As indicated, the present additives are copolymers of an oil-solubilizing (A) monomer of the type described above and an $\alpha,\beta$-unsaturated carboxylic acid wherein, in the copolymer, a portion of the carboxyl groups of said acid are esterified with a polar group-substituted alcohol and another portion thereof are esterified with a polyalkylene glycol. These ester-linked groups may be present in a monomer reactant employed in forming the copolymer, or they may be introduced into an intermediate form of the copolymer by appropriate reaction. While the processes by which the present additives can be formed are discussed more fully below, it may here be noted that suitable copolymers can readily be formed by copolymerizing the olefinically-unsaturated, oil-solubilizing ingredient with an $\alpha,\beta$-unsaturated acid or acid anhydride, and then partially esterifying the resulting copolymer with a polyglycol and then with a polypolar alcohol, or vice versa. Alternatively, one may start with a homopolymer such as a higher alkyl methacrylate and then partially hydrolyze the same, the free carboxyl groups so formed thereafter being ester-linked with the desired polyglycol and polypolar alcohol compounds.

The $\alpha,\beta$-unsaturated carboxylic acids referred to herein can be monocarboxylic in character, as represented by acrylic, methacrylic, crotonic, tiglic and angelic, $\alpha$-ethylacrylic, $\beta$-ethylcrotonic, or the like, or they can contain more than one carboxyl group. Representative polycarboxylic acids are maleic, fumaric, itaconic, glutaconic, citraconic, mesaconic and aconitic acids. In referring herein to said acids, and particularly to those of a polybasic character, it is also intended to include a corresponding anhydride thereof where the same are available. Thus, in cases where the copolymer incorporates an ester of maleic acid it is possible to substitute the corresponding anhydride for the acid in forming the copolymer. The resulting anhydride units can be esterified in the usual fashion, and any such units not thus converted to ester linkages can either be hydrolyzed to carboxyl groups or left as anhydride units in the finished copolymer.

The $\alpha,\beta$-unsaturated monocarboxylic acid components of the copolymeric additives employed in this invention have the general formula

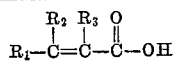

where the $R_1$'s, $R_2$'s and $R_3$'s, which can be the same as or different from one another, are selected from the group consisting of hydrogen atoms and alkyl groups of from 1 to 4 carbon atoms.

The $\alpha,\beta$-unsaturated, $\alpha,\beta$-dicarboxylic acid components of the copolymeric additives have the structural formula

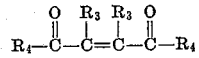

wherein the $R_3$'s, which may be the same as or different from one another, are hydrogen atoms or alkyl groups of from 1 to 4 carbon atoms each, and the $R_4$'s represent (1) a common $\diagdown O \diagup$ radical (in which case the compounds is an acid anhydride), or (2) both $R_4$'s represent —OH radicals.

A preferred group of acids for use in the present invention is made up of those which contain not more than 8 carbon atoms, while a particularly preferred group is made up of the $\alpha,\beta$-unsaturated monocarboxylic acids having 3 to 8 carbon atoms.

The polyalkylene glycols and alkyl ethers thereof used in the esterification of the copolymeric (B) and (C) components of the copolymer additives of the invention contain from 2 to 7 carbon atoms in each alkylene group, as already mentioned. Poly-1, 2-alkylene glycols and their alkyl ethers having molecular weights between 134 and 30,000 are preferred. Such glycols may be obtained by polymerizing 1, 2-alkylene oxides or mixtures thereof in the presence of a catalyst and a suitable initiator for the reaction such as water, monohydric alcohol in the case of the allyl ethers, mercaptan and the like. The preparation of polyglycol compounds of this type has been fully described heretofore in U.S. Patents 2,448,664 and 2,457,139, for example, and, therefore, requires no detailed discussion here.

For present purposes, the most suitable poly-1, 2-alkylene glycols are those derived from ethylene oxide or from 1, 2-propylene oxide or mixtures thereof and their alkyl ethers of 1 to 18 carbon atoms per alkyl group which have molecular weights or average molecular weights between about 200 and 1,000, or higher, preferably between about 400 and 10,000. Esterification with these polyalkylene glycols is found to provide the most effective detergent and wear inhibiting compositions.

The following polyalkylene glycols containing from 2 to 7 carbon atoms in each alkylene group are illustrative of the types described above.

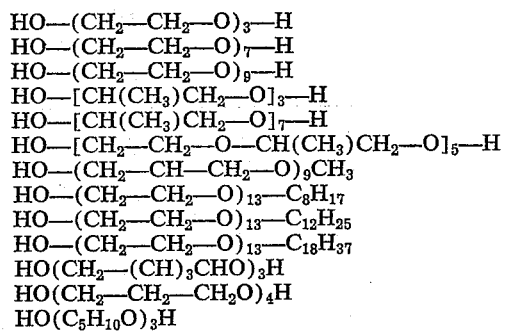

Polyethylene glycol mixtures having average molecular weights of 200, 400, 1000, 1540, 2000 or 10,000
Poly-1,2-propylene glycol mixtures having average molecular weights of 425, 1025 or 10,000

The polar group-substituted alcohols which, along with the polyalkylene glycols, are ester-linked to the $\alpha,\beta$-unsaturated carboxylic component of the copolymers, can be described as hydrocarbons, preferably, of not more than 20 carbon atoms, which, in addition to the hydroxyl or other group through which esterification takes place, are substituted by at least one hydroxyl, or amino polar group. The term "amino," as employed herein in connection with said polar groups, embraces not only the —$NH_2$ group proper, but also the group —$NHR_4$, where $R_4$ is a hydrocarbon radical which can be either unsubstituted or substituted by one or more of the aforesaid polar groups. Representative polypolar alcohols are ethylene glycol, ethanolamine, 1,2-propylene glycol, sorbitol, mannitol, glucose, erythritol, pentaerythritol, dipentaerythritol, tripentaerythritol, 3,5-dihydroxycyclohexanol, hydroxyethyl ethylenediamine, diethanolamine, triethanolamine, N,N'-dihydroxyethyl ethylenediamine, 2-aza-propanol, and the like. A still more preferred class of polypolar alcohols for employment in this invention is the aliphatic polyhydric alcohols of not more than 10 carbon atoms as represented, for example, by ethylene glycol, glycerine, sorbitol, sorbitan, pentaerythritol, dipentaerythritol and 2,2,6,6-tetramethylolcyclohexanol.

In preparing the copolymers of this invention, it is important to obtain a final product which is oil soluble, i.e., which is soluble in the petroleum or other lubricating oil employed, to the extent of at least 0.5%, and preferably 2% or more by weight. Since the various oil-solubilizing monomer components differ somewhat in their oil-solubilizing characteristics, preliminary tests are made with the polymeric additive to determine whether the relative proportion of oil-solublizing monomer compound in the copolymer is high enough to impart the desired degree of oil solubility. If the solubility in oil is unduly low, and if there remain uncombined carboxyl groups in the copolymer, the oil-solubility thereof can normally be remedied by esterifying a portion of said carboxyl groups with a higher alcohol, e.g., a $C_8$ or higher aliphatic alcohol such as n-octanol, 2-ethylhexanol, decanol, dodecanol (lauryl alcohol) or the like.

Alternatively, the polymerization reaction can be repeated employing a higher proportion of the oil-solubilizing component and/or esterifying a lower proportion of the available carboxyl groups with the polyalkylene glycol or the polar group-substituted alcohol. In general, good oil solubility coupled with the ability to impart excellent antiwear and detergent properties to oils can be obtained with copolymers incorporating from about 1 to 20 monomer units of the oil-solubilizing component for each monomer unit of the $\alpha,\beta$-unsaturated acid, whether esterified wtih the polypolar alcohol or polyglycol material or not, and wherein in each polymer molecule there are present from about 1 to 10 monomer units each of the ester-linked polyglycol and polypolar alcohol components. Preferably, there are employed those copolymers which incorporate from 3 to 15 monomer units of the oil-solubilizing component for each monomer unit of the $\alpha,\beta$-unsaturated acid, and wherein there are present from 2 to 20 hydrocarbon radicals of the type which contain a group of from 4 to 30 aliphatic carbon atoms and are capable of imparting oil solubility to the polymer, for each ester-linked polyglycol and polypolar alcohol component present in the copolymer, there being present from 1 to 4 monomer units each of the latter ester-linked components.

Although effective copolymers according to the invention are obtained with proportions of oil-solubilizing (A) monomer units and polar (B) and (C) monomer units within the aforementioned ranges, it has been noted that in a preferred application of the copolymeric lubricating oil detergent additives of the present invention in mineral lubricating oil, a certain optimum relationship appears to exist between the total number of solubilizing aliphatic carbon atoms and the total number of polar groups within the molecule. This optimum relationship which is termed "polar balance" for convenience, is expressed by the formula

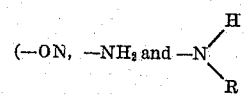

in which $PB$=polar balance, $N_p$=number of a certain polar group, $P$=polarity constant for the polar group, $N_s$=number of solubilizing aliphatic carbon atoms.

The polarity constant for free carboxyl polar groups (—COH) is 100. For hydroxyl, amino and alkyl amino polar groups,

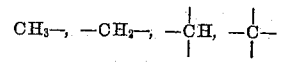

where R is alkyl, preferably of not more than 7 carbon atoms) the polarity constant is 50. For alkylene oxide groups (—RO—, where R is an alkylene group, preferably ethylene or propylene), the polarity constant is 15. The solubilizing aliphatic carbon atoms to be considered are the following:

$$CH_3-, \quad -CH_2-, \quad -\overset{|}{\underset{|}{C}}H, \quad -\overset{|}{\underset{|}{C}}-$$

and excluding aromatic ring carbon atoms and the carbon atom of carbonyl groups.

The polar balance of a given copolymer according to the above formula is equal to the sum of the number of each type of polar group multiplied by its polarity constant, said sum being then divided by the number of solubilizing aliphatic carbon atoms. For best performance, the polar balance is approximately 1. However, very effective copolymeric lubricating oil detergent additives may have polar balances in the range from 0.30 to 3.00.

The copolymers employed in a practice of this invention can be prepared by any one of several methods, as known in the art. Thus, one may polymerize a mixture of the desired monomer components to form the desired polymer. The reaction is easier to control, however, by starting with suitable precursor compounds, with the desired monomer units then being formed by the appropriate treatment of the resulting polymeric intermediate product. Thus, one may first copolymerize a given oil-solubilizing compound such as an alkyl methacrylate with a suitable acid component such as methacrylic acid or maleic anhydride; the resulting polymer is then reacted with a polyalkylene glycol whereby a portion of the free —COOH groups in the polymer intermediate become monoester-linked to the polyalkylene glycol. Thereafter the coplymer so obtained is further esterified with a polar group-substituted alcohol. The order of the latter two steps may be reversed, if desired. Other possible variations in the nature of the reactants and in the selection of a suitable reaction path would also suggest themselves to those skilled in the art.

When the polymeric additive of this invention, or a suitable polymeric intermediate, is to be prepared by reaction of monomeric components, said polymers can be prepared by conventional bulk, solution or emulsion methods in the presence of an addition polymerization initiator. Preferably, however, the copolymerization is effected in an inert organic solvent such as benzene, toluene, xylene or petroleum naphtha in the presence of a free radical-liberating type of initiator such as a peroxy compound, for example, benzoyl peroxide, acetyl peroxide, tert.butyl hydroperoxide, di-tert.butyl peroxide, dibenzoyl peroxide, or di-tert. amyl peroxide, or an azo initiator such as 1,1'-azodicyclohexanecarbonitrile or $\alpha,\alpha'$-azodiisobutyronitrile. The catalyst, or polymerization initiator, can be employed in an amount of from about 0.1 to 10%, with a preferred range being from 0.10 to 2%. If desired, the catalyst can be added in increments as the reaction proceeds. Likewise, additional portions of the solvent can also be added from time to time in order to maintain the solution in a homogeneous condition. The temperature of copolymerization varies from about 170 to 300° F., with the optimum temperature for any given preparation depending on the nature of the solvent, the concentration of monomers present in the solvent, the catalyst, and the duration of the reaction. Much the same conditions are employed when the copolymerization is effected in bulk rather than in the presence of an inert solvent.

The copolymer additives of the invention have apparent molecular weights as determined by standard light scattering methods of at least 2000 and preferably 8000. For practical purposes, molecular weights of from 100,000 to 1,000,000 are most suitable from the standpoint of viscosity and other physical characteristics of the polymeric additives.

Typical methods for preparing the copolymers which can be employed with success as detergents and antiwear additives in lubricant compositions are given in the following examples.

EXAMPLE I 307 g. (0.95 mole) of allyl stearate, 93 g. (0.95 mole) of maleic anhydride, and 10 cc. of benzene were charged to a three-necked flask fitted with a stirrer, thermometer, reflux condenser, and dropping funnel. The mixture was heated to 220–225° F. with stirring. A solution of 8 g. of benzoyl peroxide in 80 cc. of benzene was then added over a period of 3 to 4 hours during which time the temperature was maintained between 220° F. and 230° F. by heating or cooling as required. Toluene was added at intervals to facilitate stirring of the mixture. Following the addition of all of the benzoyl peroxide solution, 2.0 g. of tertiary butyl hydroperoxide in 25 cc. of benzene was added, the mixture was thoroughly stirred, and then let stand for about 18 hours at 195° F.

The product obtained above was stripped to 370° F. at 1 mm. mercury pressure to give 392 g. of an allyl stearate maleic anhydride copolymer which was shown by analyses to contain equimolar amounts of the two monomers.

100 g. of the above allyl stearate maleic anhydride copolymer, 12.4 g. (0.118 mole) of ethanolamine hydrochloride (theory for 25% esterification of available free acid), 200 g. of phenol, 0.2 g. of p-toluene sulfonic acid monohydrate and xylene were charged to a three-necked flask fitted with a stirrer, thermometer, reflux condenser, and water receiver. The mixture was heated to reflux temperature, 350° F. with stirring and kept at this temperature for a period of 4½ hours. At this point 44 g. (0.236 mole) dodecyl alcohol (theory for 50% esterification of available free acid), and 0.2 g. catalyst were added. The mixture was maintained at this same reflux temperature for another 7½ hours. 19 g. (0.047 mole) of a polyethylene glycol having an average molecular weight of 400, and 0.2 g. of catalyst were then added. The reaction mixture was maintained at 350° F. for another 6½ hours. The phenol, xylene, and unreacted dodecyl alcohol were stripped from the reaction mixture. The product was dissolved in about one liter of diethyl ether. The solution was washed with a caustic solution containing 0.149 g. of sodium hydroxide in 300 cc. of water followed by two water washes of 300 cc. each. The ether solution was then dried over anhydrous sodium sulfate. The solvent was removed by distillation and the resulting polymeric derivative showed by analyses to be a copolymer of allyl stearate and maleic anhydride in which approximately 25% of the available acid was esterified with β-aminoethyl groups, 30% dodecyl and 6% polyethylene glycol groups. The product thus obtained was a copolymer of allyl stearate, dodecyl 2-aminoethyl maleate, dodecyl nonaethylene glycol maleate and maleic anhydride in 20/10/1/9 monomer ratio.

EXAMPLE II 203 g. (0.8 mole) of dodecyl methacrylate, 3.4 g. (0.04 mole) of methacrylic acid, and 28.3 g. (0.04 mole) of tridecyl-capped decaethylene glycol methacrylate (molecular weight 708) were charged to a three-necked flask fitted with a stirrer, thermometer reflux condenser and dropping funnel. The mixture was heated to 220–225° F. with stirring. A solution of 1.5 g. of benzoyl peroxide in 50 cc. of benzene was then added dropwise over a period of 7 hours. The mixture was stirred for another hour after all of the catalyst had been added. The mixture obtained was stripped to 380° F. at 1 mm. of mercury to remove benzene, unreacted dodecyl methacrylate and methacrylic acid. The resulting product, 220 g., was a viscous, oil-soluble polymer which was shown by analyses to contain dodecyl methacrylate, methacrylic acid, and tridecyl-capped decaethylene glycol methacrylate in a molar ratio of approximately 20/1/1.

54.5 g. of the above copolymer was dissolved in sufficient benzene to give a 20% by weight solution. The polymer was precipitated with 4 volumes of methanol. 45 g. of the precipitated polymer, 1.68 g. (0.12 mole) of pentaerythritol (50% excess of theory for 100% esterification of available acid), 42 g. of phenol, 0.1 g. of p-toluene sulfonic acid monohydrate and xylene were charged to a three-necked flask fitted with a stirrer, thermometer, reflux condenser, and water receiver. The mixture was stirred and heated at reflux temperature, 345° F., for 9 hours. The polymer was again precipitated with methanol as above. Analyses of the recovered product indicated a dodecyl methacrylate methacrylic acid tridecyl-capped decaethylene glycol methacrylate polymer in which 30% of the total acid was esterified with pentaerythritol. The product thus obtained was a copolymer of dodecyl methacrylate, tridecyl ether of decaethylene glycol methacrylate, methacrylic acid and pentaerythritol methacrylate in 60/3/2/1 monomer ratio.

EXAMPLE III 142 g. (0.478 mole) of mixed $C_{13}$ to $C_{18}$ alkyl methacrylates (average molecular weight of 296), 19 g. (0.02 mole) of tridecyl-capped hexadecaethylene glycol methacrylate (molecular weight 954), 1.7 g. (0.02 mole) of methacrylic acid, and 3.7 g. (0.02) mole of N,N-diethylaminoethyl methacrylate were charged to a three-necked flask fitted with a stirrer, thermometer, reflux condenser, and dropping funnel. The mixture was heated to 220–225° F. with stirring. A solution of 3.3 g. of benzoyl peroxide in 35 cc. of benzene was added over a period of 6 hours. The mixture was stirred for another hour at 220–225° F. after addition of all the catalyst.

The polymer obtained was twice precipitated from a 20% by weight benzene solution with 5 volumes of methanol to give 135 g. of product. The viscous, oil-soluble polymer was shown by analyses to contain the mixed $C_{13}$ to $C_{18}$ alkyl methacrylates, tridecyl-capped polyglycol methacrylate, methacrylic acid, and diethylaminoethyl methacrylate in a molar ratio of approximately 24/1/1/1. The product thus obtained was a copolymer of tridecyl methacrylate, octadecyl methacrylate, methacrylic acid, tridecyl ether of hexadecaethylene glycol methacrylate and N,N-diethylaminoethyl methacrylate in 14/10/1/1/1 monomer ratio.

EXAMPLE IV 136 g. (0.54 mole) of dodecyl methacrylate, 28.3 g. (0.04 mole) of tridecyl-capped polyglycol methacrylate (molecular weight 708), and 5.2 g. (0.04 mole) ethylene glycol monomethacrylate were charged to a three-necked flask as in Example III above. The mixture was heated to 220–225° F. with stirring. A solution of 3.5 g. of benzoyl peroxide in 35 cc. benzene was added dropwise over a period of 6 hours. The mixture was heated at 220–225° F. for another hour after all of the catalyst solution had been added.

440 g. of lubricating oil was added to the reaction mixture. The light solvent, unreacted dodecyl methacrylate, and ethylene glycol monomethacrylate, were stripped from the reaction mixture to give 164 g. of polymer as a 29% concentrate. The polymer was shown by analyses to contain dodecyl methacrylate, tridecyl-capped polyglycol methacrylate, and ethylene glycol monomethacrylate in a molar ratio of about 14/1/1. The product thus obtained was a copolymer of dodecyl methacrylate, tridecyl ether of decaethylene glycol methacrylate and ethylene glycol monomethacrylate in 14/1/1 monomer ratio.

EXAMPLE V 253 g. (1 mole) of octadecene, 98 g. (1 mole) of maleic anhydride, and 10 cc. of benzene were charged to a three-necked flask as described in Example IV. The mixture was heated to 220–225° F. with stirring. A solution of 7 g. of benzoyl peroxide in 70 cc. of benzene was added dropwise to the reaction mixture over a 7-hour period. It was stripped to 380° F. at 1 mm. of mercury to remove solvent and unreacted monomers. The resulting polymer, 334 g., was shown by analyses to contain octadecene and maleic anhydride in a molar ratio of approximately 1/1.

153 g. of the above octadecene maleic anhydride copolymer, 138 g., (0.74 mole), of dodecyl alcohol (theory for 85% esterification of available free acid), 0.5 g. of p-toluene sulfonic acid monohydrate, and xylene were charged to a three-necked flask fitted with a stirrer, thermometer, reflux condenser, and water receiver. The mixture was stirred and heated at reflux temperature, 320° F., for a period of 12 hours. At this point 230 g. of phenol, 48 g. (0.353 mole) of pentaerythritol, and 0.2 g. of p-toluene sulfonic acid monohydrate were added to the reaction mixture. Xylene was withdrawn to give a reflux temperature of 345–350° F. The reaction mixture was refluxed at this temperature for a period of 11 hours. It was then taken up in 1 liter of diethyl ether, and the solution was washed with three 400 cc. portions of 5% sodium chloride solution to remove unreacted pentaerythritol. The solution was dried over anhydrous sodium sulfate, filtered, and stripped of salts. Analyses of the viscous, oil-soluble product indicated an octadecene maleic anhydride copolymer in which 62% of the available free acid was esterified with dodecyl alcohol and 23% with pentaerythritol. The product thus obtained was a copolymer of octadecene, didodecyl maleate, dodecyl monopentaerythritol maleate and dodecyl acid maleate in 20/6/10/3 monomer ratio.

In general, excellent detergent and antiwear properties can be imparted to lubricating oils by dissolving therein a quantity of from about 0.1 to 10% by weight of the copolymers of the type described above, although a preferred range is from about 0.5 to 5% by weight. The copolymeric additives of this invention can be used with good effect in the case of any one of a wide variety of oils of lubricating viscosity, or of blends of such oils. Thus, the base oil can be a refined Pennsylvania or other paraffin base oil, a refined napthenic base oil, or a synthetic hydrocarbon or non-hydrocarbon oil of lubricating viscosity. As synthetic oils there can be mentioned alkylated waxes and similar alkylated hydrocarbons of relatively high molecular weight, hydrogenated polymers of hydrocarbons, and the condensation products of chlorinated alkyl hydrocarbons with aromatic compounds. Other suitable oils are those which are obtained by polymerization of lower molecular weight alkylene oxides such as propylene and/or ethylene oxide. Still other synthetic oils are obtained by etherification and/or esterification of the hydroxy groups in alkylene oxide polymers such as, for example, the acetate of the 2-ethyl-hexanol-initiated polymer of propylene oxide. Other important classes of synthetic oils include the various esters as, for example, di(2-ethylhexyl) sebacate, tricresyl phosphate and silicate esters. If desired, the oil can be a mixture of mineral and synthetic oils.

While satisfactory lubricant compositions can be obtained by adding to the base oil employed only one or more of the copolymeric additives of the type described above, it also falls within the purview of this invention to provide lubricant compositions which contain not only such copolymers, but also other additives such as pour point depressants, oiliness and extreme pressure agents, antioxidants, corrosion inhibiting agents, blooming agents, thickening agents, and/or compounds for enhancing the temperature-viscosity characteristics of the oil. The present invention also contemplates the addition to the lubricant composition (particularly when the amount of copolymer employed is relatively small) of auxiliary detergents and/or antiwear agents.

The efficacy of copolymeric additives of the type described above as detergents and antiwear agents in lubricating oils is illustrated by data from a number of tests. In the tests from which the data is obtained the base oil, unless otherwise specified, is a solvent-refined, wax-free SAE–30 grade mineral lubricating oil having a viscosity index of 85 which is derived from California waxy crude. Various amounts of the copolymeric additives are incorporated into the oil as noted in terms of percent by weight.

In the lacquer deposition test the low temperature detergency of the oils tested is measured by determining the ability of the oil to solubilize and retain typical engine fuel deposits and precursors thereof which are formed due to incomplete combustion of the fuel. Retention of these deposits in a given oil depends upon their dispersal and upon minimizing their polymerization to lacquer.

Briefly described, the lacquer deposition test involves condensing fresh cool flame oxidation products from a standard test fuel simulating the fuel combustion products of an internal combustion engine in a steel vessel containing a certain amount of the lubricating oil being tested. The steel surface of the vessel acts as an iron catalyst for polymerization of the fuel oxidation products to lacquer in the same manner as the steel surfaces in an internal combustion engine. After the oxidation products have been condensed, the steel vessel containing the lubricating oil is heated for 24 hours at a temperature selected to correspond with actual engine conditions. The test oil is then decanted while hot from the lacquer deposits formed in the steel vessel due to polymerization and the lacquer deposits are de-oiled and weighed.

In the actual test a low grade gasoline is employed of the type described in connection with the standard FL–2 test procedure given below. The gasoline at a rate of 13.3 cc. per hour is vaporized and mixed with air, the air rate being 1.75 liters per minute. The vapor mixture of gasoline and air is then fed into an elongated cool flame combustion chamber of standard design having a diameter of 1½ inches. The cool flame combustion chamber is maintained at 695° F. The test is continued for 1 hour during which the oxidation products issuing from the cool flame combustion chamber are condensed into the weighed steel catalyst vessel which contains 30 g. of the oil being tested at about room temperature. The steel vessel containing test oil and condensed oxidation products is then heated for 24 hours at 110° F. The oil is decanted from the lacquer deposits in the vessel, following which the deposits are de-oiled by washing with petroleum solvent. The increase in weight of the steel vessel due to the lacquer deposits is then determined and recorded in milligrams as "LD" or "laquer deposit."

The lacquer deposit for any given lubricant composition obtained in accordance with the procedure described above is directly correlated to the "piston varnish rating" or "PVR" obtained from the same lubricant composition in the standard FL–2 test procedure previously referred to and hereinafter more particularly described. Table II which follows gives the correlated values for both the lacquer deposits and piston varnish ratings.

Table II

| LD | PVR | LD | PVR |
|---|---|---|---|
| 140 | 9.5 | 335 | 6.0 |
| 170 | 9.0 | 370 | 5.5 |
| 190 | 8.5 | 420 | 5.0 |
| 220 | 8.0 | 480 | 4.5 |
| 245 | 7.5 | 570 | 4.0 |
| 275 | 7.0 | 700 | 3.5 |
| 305 | 6.5 | 850 | 3.0 |

The correlated values in the above table provide an accurate means for estimating from the lacquer deposits determined for a given oil the piston varnish rating to be obtained in the standard FL-2 Chevrolet engine test.

In the test where the piston varnish ratings are obtained, a given lubricating oil composition is tested as the crankcase lubricant in a 6-cylinder Chevrolet engine using a low grade gasoline especially prone to cause engine deposits, the conditions being those defined in the standard FL-2 test procedure as described in the June 21, 1948 report of the Coordinating Research Council. This procedure requires the maintenance of a jacket temperature of 95° F. and a crankcase oil temperature of 155° F. at 2500 r.p.m. and 45 brake horsepower of 40 hours, and therefore closely simulates the relatively "cold" engine conditions which are normally experienced in city driving. At the end of each test, the engine is dismantled and the amount of engine deposits on the piston determined and expressed as the piston varnish rating. This value is obtained by visually rating (on a scale of 0 to 10, with 10 representing the absence of any deposit) the amount of deposit on each piston skirt and averaging the individual ratings so obtained for the various pistons. Under the conditions of this test, a piston varnish rating of 4.5 is indicative of satisfactory performance, though preferably this rating should be 5 or above. The wear experienced by the piston rings during the test is also measured in certain cases and expressed in mgs. of metal lost per hour. 5 mgs. per hour is regarded as satisfactory, though preferably the loss should be 3 mgs. or less per hour. In the case of the base oil alone without the addition of any additives it is found that the piston varnish rating is approximately 3.0 and the piston ring weight loss is 5.5 mgs./hr. On the other hand, as indicated by the data presented in Table III below, when the base oil is compounded with the indicated amounts of a copolymer, greatly superior results are obtained.

Table III

| Lubricant composition | Ratio of (1) monomer to (2) monomer to (3) monomer, etc. | Piston varnish rating | Lacquer deposit (milligrams) | Piston varnish rating (estimated from lacquer deposit) |
|---|---|---|---|---|
| Base oil alone | | 3.0 | 850 | |
| 2.8% copolymer of (1) dodecyl methacrylate, (2) tridecyl ether of decaethylene glycol methacrylate, (3) methacrylic acid and (4) pentaerythritol methacrylate in base oil | 60/3/2/1 | | 352 | 5.8 |
| 2.8% copolymer of (1) tridecyl methacrylate, (2) octadecyl methacrylate, (3) methacrylic acid, (4) tridecyl ether of hexadecaethylene glycol methacrylate, and (5) N,N-diethylaminoethyl methacrylate in base oil | 14/10/1/1/1 | | 244 | 7.5 |
| 2.8% copolymer of (1) dodecyl methacrylate, (2) tridecyl ether of decaethylene glycol methacrylate, and (3) ethylene glycol monomethacrylate in base oil | 14/1/1 | | 160 | 9.4 |
| 2.8% copolymer of (1) octadecene, (2) didodecyl maleate, (3) dodecyl monopentaerythritol maleate, and (4) dodecyl acid maleate in base oil | 20/6/10/3 | | 500 | 4.4 |

The utility of still other lubricant compositions in accordance with the invention in which various representative oils of lubricating viscosity are employed is illustrated by the additional examples given in the following table.

Table IV

| Lubricant composition | Base oil | Ratio of (1) monomer to (2) monomer to (3) monomer, etc. | Viscosity at 100° F., S.S.U. | Viscosity at 210° F., S.S.U. | Viscosity index |
|---|---|---|---|---|---|
| Base oil alone | Dioctyl phthalate | | 139.8 | 40.28 | 10 |
| 2.8% copolymer of (1) allyl stearate, (2) dodecyl 2-aminoethyl maleate, (3) dodecyl nonaethylene glycol maleate and (4) maleic anhydride in base oil | do | 20/10/1/9 | 150.3 | 41.58 | 48 |
| 2.8% copolymer of (1) dodecyl methacrylate, (2) tridecyl ether of decaethylene glycol methacrylate, (3) methacrylic acid and (4) pentaerythritol methacrylate in base oil | do | 60/3/2/1 | 293.5 | 57.86 | 95 |
| 2.8% copolymer of (1) tridecyl methacrylate, (2) octadecyl methacrylate, (3) methacrylic acid, (4) tridecyl ether of hexadecaethylene glycol methacrylate and (5) N,N-diethylaminoethyl methacrylate in base oil | do | 14/10/1/1/1 | 303.2 | 60.21 | 135 |
| 2.8% copolymer of (1) dodecyl methacrylate, (2) tridecyl ether of decaethylene glycol methacrylate and (3) ethylene glycol monomethacrylate in base oil | do | 14/1/1 | 324.0 | 61.63 | 133 |
| 2.8% copolymer of (1) octadecene, (2) didodecyl maleate, (3) dodecyl monopentaerythritol maleate and (4) dodecyl acid maleate in base oil | do | 20/6/10/3 | 166.3 | 43.21 | 74 |
| Base oil alone | Mixed hexyl-octyl orthosilicate | | 45.19 | 33.52 | 183 |
| 2.8% copolymer of (1) dodecyl methacrylate, (2) tridecyl ether of decaethylene glycol methacrylate, (3) methacrylic acid and (4) pentaerythritol methacrylate in base oil | do | 60/3/2/1 | 57.98 | 38.49 | 252 |
| 2.8% copolymer of (1) tridecyl methacrylate, (2) octadecyl methacrylate, (3) methacrylic acid, (4) tridecyl ether of hexadecaethylene glycol methacrylate and (5) N,N-diethylaminoethyl methacrylate in base oil | do | 14/10/1/1/1 | 64.85 | 40.75 | 242 |
| 2.8% copolymer of (1) dodecyl methacrylate, (2) tridecyl ether of decaethylene glycol methacrylate and (3) ethylene glycol monomethacrylate in base oil | do | 14/1/1 | 57.87 | 39.84 | 275 |
| 2.8% copolymer of (1) octadecene, (2) didodecyl maleate, (3) dodecyl monopentaerythritol maleate, and (4) dodecyl acid maleate in base oil | do | 20/6/10/3 | 50.56 | 35.29 | 203 |
| Base oil alone | Octyl oxy octapropylene glycol acetate | | 86.64 | 39.81 | 170 |
| 2.8% copolymer of (1) dodecyl methacrylate, (2) tridecyl ether of decaethylene glycol methacrylate, (3) methacrylic acid, and (4) pentaerythritol methacrylate in base oil | do | 60/3/2/1 | 141.0 | 51.13 | 171 |

Table IV—Continued

| Lubricant composition | Base oil | Ratio of (1) monomer to (2) monomer to (3) monomer, Etc. | Viscosity at 100° F., S.S.U. | Viscosity at 210° F., S.S.U. | Viscosity index |
|---|---|---|---|---|---|
| 2.8% copolymer of (1) tridecyl methacrylate, (2) octadecyl methacrylate, (3) methacrylic acid, (4) tridecyl ether of hexadecaethylene glycol methacrylate, and (5) N,N-diethylaminoethyl methacrylate in base oil. | Octyl oxy octapropylene glycol acetate. | 14/10/1/1/1 | 150.5 | 53.02 | 171 |
| 2.8% copolymer of (1) dodecyl methacrylate, (2) tridecyl ether of decaethylene glycol methacrylate and (3) ethylene glycol monomethacrylate in base oil. | do | 14/1/1 | 157.4 | 54.33 | 170 |
| Base oil alone | Neutral mineral lube oil. | | 139.4 | 42.13 | 90 |
| 2.8% copolymer of (1) dodecyl methacrylate, (2) tridecyl ether of decaethylene glycol methacrylate, (3) methacrylic acid and (4) pentaerythritol methacrylate in base oil. | do | 60/3/2/1 | 236.8 | 55.3 | 141 |
| 2.8% copolymer of (1) tridecyl methacrylate, (2) octadecyl methacrylate, (3) methacrylic acid, (4) tridecyl ether of hexadecaethylene glycol methacrylate, and (5) N,N-diethylaminoethyl methacrylate in base oil. | do | 14/10/1/1/1 | 254.3 | 58.1 | 138 |
| 2.8% copolymer of (1) dodecyl methacrylate, (2) tridecyl ether of decaethylene glycol methacrylate, and (3) ethylene glycol monomethacrylate in base oil. | do | 14/1/1 | 247.6 | 58.9 | 148 |
| 2.8% copolymer of (1) octadecene, (2) didodecyl maleate, (3) dodecyl monopentaerythritol maleate, and (4) dodecyl acid maleate in base oil. | do | 20/6/10/3 | 165.5 | 44.85 | 109 |

From the tests of the foregoing table it will be seen that each of the illustrative compositions containing the copolymeric lubricating oil additives according to the invention possess improved lubricating properties compared to the base oils alone.

In the foregoing description of the invention, the term "hydrocarbyl" is used with reference to the class of organic groups commonly known as "hydrocarbon groups." As employed herein, this term is considered to be a more convenient and concise generic expression for describing said hydrocarbon groups.

This application is a continuation-in-part of Stewart, Stuart and Lowe, patent application Serial No. 355,854, filed May 18, 1953, and now abandoned.

We claim:

1. An oil-soluble copolymer of monomers selected from at least each of the first three classes of the classes consisting of (A) polymerizable oil-solubilizing compounds selected from the group consisting of olefinic hydrocarbons, olefinic ethers containing a single oxygen atom and hydrocarbon carboxylic acids containing at most two carboxy groups fully esterified with monohydroxy hydrocarbons, said compounds having a single ethylenic linkage and containing a monovalent hydrocarbon group of from 8 to 30 aliphatic carbon atoms, (B) esters of acidic compounds selected from the group consisting of esters α,β-ethylenically unsaturated monocarboxylic acids of from 3 to 8 carbon atoms each and diesters of α,β-ethylenically unsaturated α,β-dicarboxylic acids of from 4 to 12 carbon atoms each, said esters having the carboxyl groups of the acids monoester-linked to a member of the group consisting of poly-1,2-alkylene glycols and monoalkyl ethers thereof having from 2 to 7 carbon atoms in each alkylene group and a molecular weight of between about 200 to 10,000, (B¹) esters of the monocarboxylic acids and dicarboxylic acids as defined in (B) having the carboxyl groups of the acids monoester-linked to an aliphatic alcohol from 2 to 10 carbon atoms wherein at least 50% of the carbon atoms of said alcohol are attached to polar groups selected from the group consisting of hydroxyl and amino groups, and (C) acidic compounds selected from the group consisting of α,β-ethylenically unsaturated monocarboxylic acids of from 3 to 8 carbon atoms each, α,β-ethylenically unsaturated α,β-dicarboxylic acids of from 4 to 12 carbon atoms each, anhydrides of said dicarboxylic acids and half-esters of said dicarboxylic acids, with a member of the group consisting of poly-1,2-alkylene glycols, alkyl ethers thereof and aliphatic alcohols as defined in (B), said oil-soluble copolymer having an apparent molecular weight of at least 2,000 as determined by the light scattering method and from about 1 to 20 monomer units of the oil-solubilizing component (A) for each monomer unit of components (B), (B¹) and (C).

2. An oil-soluble copolymer of (A) polymerizable oil-solubilizing compounds selected from the group consisting of olefinic hydrocarbons, olefinic ethers containing a single oxygen atom and hydrocarbon carboxylic acids containing at most two carboxy groups fully esterified with monohydroxy hydrocarbons, said compounds having a single ethylenic linkage and containing a monovalent hydrocarbon group of from 8 to 30 aliphatic carbon atoms, (B) esters of α,β-ethylenically unsaturated monocarboxylic acids of from 3 to 8 carbon atoms each, said esters having the carboxyl groups of the acids monoester-linked to a member of the group consisting of poly-1,2-alkylene glycols and monoalkyl ethers thereof having from 2 to 7 carbon atoms in each alkylene group and a molecular weight from between about 200 and 10,000, (B¹) esters of the monocarboxylic acids as defined in (B) having the carboxyl groups of the acids monoester-linked to an aliphatic alcohol of from 2 to 10 carbon atoms wherein at least 50% of the carbon atoms of said alcohol are attached to polar groups selected from the group consisting of hydroxyl and amino groups, and (C) α,β-ethylenically unsaturated monocarboxylic acids of from 3 to 8 carbon atoms each, said oil-soluble copolymer having an apparent molecular weight of at least 2,000 as determined by the light scattering method, and from about 1 to 20 monomer units of the oil-solubilizing component (A) for each monomer unit of the (B), (B¹) and (C) components.

3. An oil-soluble copolymer of (A) polymerizable oil-solubilizing compounds selected from the group consisting of olefinic hydrocarbons, olefinic ethers containing a single oxygen atom and hydrocarbon carboxylic acids containing at most two carboxy groups fully esterified with monohydroxy hydrocarbons, said compounds having a single ethylenic linkage and containing a monovalent hydrocarbon group of from 8 to 30 aliphatic carbon atoms, (B) diesters of α,β-ethylenically unsaturated α,β-dicarboxylic acids of from 4 to 12 carbon atoms each, said esters having the carboxyl groups of the acids monoester-linked to a member of the group consisting of poly-1,2-alkylene glycols and monoalkyl ethers thereof having from 2 to 7 carbon atoms in each alkylene group and a molecular weight between about 200 and 10,000, (B¹) esters of the dicarboxylic acids as defined in (B) having the carboxyl groups of the acids, monoester-linked to an aliphatic alcohol of from 2 to 10 carbon atoms wherein at least 50% of the carbon atoms of said alcohol are attached to polar groups selected from the group consisting of hydroxyl and amino groups and (C) α,β-ethylenically unsaturated α,β-dicarboxylic acids of from 4 to 12 carbon atoms each, said oil-soluble copolymer having an apparent molecular weight of at least 2,000 as determined by the light scattering method and from about 1 to 20 monoester units of the oil-solubilizing component (A) for each monomer unit of the (B), (B¹) and (C) components.

4. An oil-soluble copolymer of (A) polymerizable oil solubilizing compounds selected from the group consisting of olefinic hydrocarbons, olefinic ethers containing a single oxygen atom and hydrocarbon carboxylic acids containing at most two carboxy groups fully esterified with monohydroxy hydrocarbons, said compounds having a single ethylenic linkage and containing a monovalent hydrocarbon group of from 8 to 30 aliphatic carbon atoms and (B) esters of $\alpha,\beta$-ethylenically unsaturated monocarboxylic acids from 3 to 8 carbon atoms each, said esters having the carboxyl groups of the acids monoester-linked to a member of the group consisting of poly-1,2-alkylene glycols and monoalkyl ethers thereof having from 2 to 7 carbon atoms in each alkyl group and a molecular weight between about 200 and 10,000, (B¹) esters of the monocarboxylic acids as defined in (B) having the carboxyl groups of the acids monoester linked to an aliphatic alcohol of from 2 to 10 carbon atoms wherein at least 50% of the carbon atoms of said alcohol are attached to polar groups selected from the group consisting of hydroxyl and amino groups, said oil-soluble copolymer having an apparent molecular weight of at least 2,000, as determined by the light scattering method and from about 1 to 20 monomer units of the oil-solubilizing component (A) for each monomer unit of the (B) and (B¹) components.

5. An oil-soluble copolymer of (A) polymerizable oil-solubilizing compounds selected from the group consisting of olefinic hydrocarbons, olefinic ethers containing a single oxygen atom and hydrocarbon carboxylic acids containing at most two carboxy groups fully esterified with monohydroxy hydrocarbons, said compounds having a single ethylenic linkage and containing a monovalent hydrocarbon group of from 8 to 30 aliphatic carbon atoms and (B) diesters $\alpha,\beta$-ethylenically unsaturated $\alpha,\beta$-dicarboxylic acids of from 4 to 12 carbon atoms each, said esters having the carboxyl groups of the acids monoester-linked to a member of the group consisting of poly-1,2-alkylene glycols and monoalkyl ethers thereof having from 2 to 7 carbon atoms in each alkylene group and a molecular weight from between about 200 to 10,000, (B¹) esters of the dicarboxylic acids as defined in (B) having the carboxyl groups of the acids monoester linked to an alcohol of from 2 to 10 carbon atoms wherein at least 50% of the carbon atoms of said alcohol are attached to polar groups selected from the group consisting of hydroxyl and amino groups, said oil-soluble copolymer having an apparent molecular weight of at least 2,000 as determined by the light scattering method and from about 1 to 20 monomer units of the oil-solubilizing component (A) for each monomer unit of the (B) and (B¹) components.

6. An oil-soluble copolymer of (A) a higher alkyl ester of an $\alpha,\beta$-ethylenically unsaturated monocarboxylic acid of from 3 to 8 carbon atoms, said alkyl groups having from 8 to 30 carbon atoms and (B) an ester of an $\alpha,\beta$-ethylenically unsaturated monocarboxylic acid of from 3 to 8 carbon atoms, in which the carboxyl group of said acid are monoester-linked to a polyethylene glycol having a molecular weight between about 200 and 10,000, and (B¹) an ester of a monocarboxylic acid as defined in (B) having the carboxyl group of said acid monoester-linked to an aliphatic amino alcohol of from 2 to 10 carbon atoms having at least 50 percent of the carbon atoms attached to amino and hydroxy groups, said oil-soluble copolymer having a molecular weight of at least 2,000, as determined by the light scattering method and from 1 to 20 monomer units of the higher alkyl ester of $\alpha,\beta$-ethylenically unsaturated monocarboxylic acid (A) monomer for each monomer unit of the (B) and (B¹) monomers.

7. An oil-soluble copolymer of (A) a mixture of tridecyl methacrylate and octadecyl methacrylate, (B) tridecyl ether of hexadecaethylene glycol methacrylate (B¹) N,N-diethylaminoethyl methacrylate, and (C) methacrylic acid, said oil-soluble copolymer having an apparent molecular weight of at least 2,000 as determined by the light scattering method and from about 1 to 20 monomer units of the oil-solubilizing (A) components for each monomer unit of the (B), (B¹) and (C) components.

8. An oil-soluble copolymer of (A) dodecyl methacrylate and (B) tridecyl ether of decaethylene glycol methacrylate and (B¹) ethylene glycol monomethacrylate, said oil-soluble copolymer having an apparent molecular weight of at least 2,000 as determined by the light scattering method and from about 1 to 20 monomer units of the oil-solubilizing (A) component for each monomer unit of the (B) and (B¹) components.

References Cited in the file of this patent

UNITED STATES PATENTS

| | | |
|---|---|---|
| 2,047,398 | Voss | July 14, 1936 |
| 2,255,313 | Ellis | Sept. 9, 1941 |
| 2,615,844 | Giammaria | Oct. 28, 1952 |
| 2,618,845 | Lippincott | Oct. 28, 1952 |